United States Patent [19]
Sato

[11] 3,914,737
[45] Oct. 21, 1975

[54] DIRECTION TURN SIGNAL SYSTEM
[75] Inventor: Hitoshi Sato, Yokohama, Japan
[73] Assignee: Niles Parts Company Limited, Tokyo, Japan
[22] Filed: Nov. 20, 1974
[21] Appl. No.: 525,738

[52] U.S. Cl. .................................. 340/55; 340/73
[51] Int. Cl.² .......................................... B60Q 1/34
[58] Field of Search .......... 340/55, 54, 56, 331, 67, 340/73; 200/61.28, 61.27

[56] References Cited
UNITED STATES PATENTS
3,233,218   2/1966   Borden ...................... 200/61.27 X

*Primary Examiner*—Alvin H. Waring
*Attorney, Agent, or Firm*—Gifford, Chandler & Sheridan

[57] ABSTRACT

A directional turn signal system for automotive vehicles built with IC units so as to reduce the size and assure reliable operation. In this system, the logical product of the outputs of two flip-flop circuits is controlled by two reed switches for sensing the left turn and right turn of the handle post, and the impulse from the reed switch for sensing the neutral position of the handle post is fed to the left and the right flip-flop circuits together with the impulse from one of the manual turn switches whereby one of the outputs of the flip-flop circuits acts to flash the corresponding signal lamps so as to indicate the turn direction.

Thus turn signal lamps stay flashing during the automatic return movement of the turn switches.

1 Claim, 1 Drawing Figure

U.S. Patent  Oct. 21, 1975  3,914,737
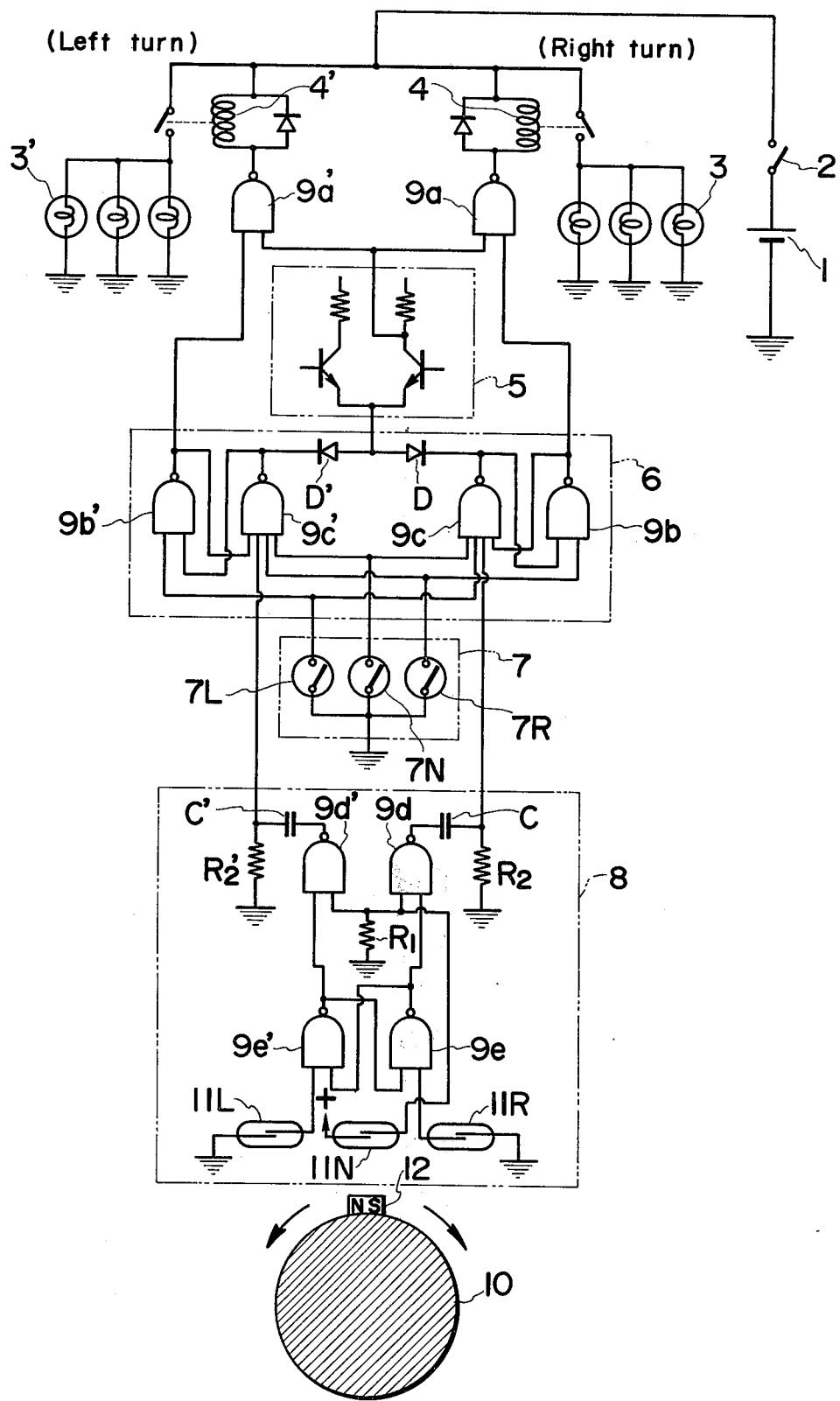

DIRECTION TURN SIGNAL SYSTEM

BACKGROUND OF THE INVENTION

In the directional turn signal systems now widely employed by automotive vehicles, the handle post is provided with two diagonally opposite juts. Upon engagement of one of the juts with the release member of the manual rotative turn switch, the latter is allowed to return automatically to the neutral position.

One of the defects of such systems is that no directional turn signal appears during the automatic return movement as a result of which traffic accidents can occur.

One object of this invention is to do away with such a defect. Another object is to reduce the size of the device through employing IC units and a still further object is to assure reliable operation.

DESCRIPTION OF THE INVENTION

As shown in the single FIGURE of the drawing, the directional turn signal system for automotive vehicles according to this invention consists of symmetrical left turn and right turn signal circuits and their controlling means. Among the components, 3 and 3' are signal lamps, 4 and 4' are relays, 5 is an oscillator, 6 is a matrix, 7 is a group of manual turn switches, 8 is an automatic return circuit, 9a, 9b, 9c, 9d, 9e, 9a', 9b', 9d' and 9e' are NAND circuits, 10 is a handle post, 11L, 11R and 11N are reed switches acting as sensors for the left turn, the right turn and the neutral position of the handle post, 12 is a permanent magnet attached to the handle post, C and C' are condensers, D and D' are diodes, and $R_1$, $R_2$ and $R_2'$ are resistors.

As the left turn and the right turn signal circuits are symmetrical, it will suffice to study the operation of one of the turn signal circuits, for example, the right turn signal circuit, to understand the function of this system.

First, a battery 1 is connected to the system by closing a switch 2. In the flip-flop circuit composed of NANDs 9b and 9c, the level of one of the inputs to the NAND 9c is set at low L through the resistor $R_2$, the output of the NAND 9b is stable at the level of L.

As the output of the NAND 9a is H, the relay 4 does not operate and the lamps 3 stay unlit. Further, as the level of the output of the NAND 9b is H, the oscillator 5 stays inoperative.

Next, push the right turn switch 7R. Then, as the level of one of the inputs to the NAND 9b becomes L, the flip-flop circuit reverses whereby the level of the output of the NAND 9b becomes H while the level of the output of the NAND 9c becomes L. Then, through the diode D, the oscillator 5 being grounded, the latter begins to oscillate at once. As the level of one of the inputs to the NAND 9a becomes H and L alternately by the reversals of the flip-flop circuit while the level of the other input to the NAND 9a is set at H whereby the intermittent outputs of the NAND 9a prepared by the logic product of the two inputs activate the relay 4 intermittently so as to flash the lamps 3 to indicate the right turn.

In order to suspend the flashing of the lamps 3, it suffices to reverse the flip-flop circuit by operating the switch 7N so as to change the level of one of the inputs to the NAND 9c to L.

If the switch 7R is closed to signal a left turn, this mistake will be corrected easily by pushing the left turn switch 7L, because by the closure of the switch 7L, the flip-flop circuit will be reversed through the change of the level of one of the inputs to the NAND 9c to L whereby the flashing of the right turn signal lamps 3 will be suspended at once and at the same time as the level of one of the inputs to the NAND 9b' is set at L, the left turn signal lamps 3' begin to flash.

Next, the function of the automatic return circuit 8 will be explained. If the handle post 10 is turned to the right while the lamps 3 are flashing, the reed switches will be closed 11N - 11R or 11L - 11N - 11R in order by the action of the permanent magnet 12. In the case of 11L - 11N - 11R, by the closure of the reed switch 11L, the level of one of the inputs to the NAND 9e' becomes L whereby the level of the output of the NAND 9e becomes L. The NANDSs 9e and 9e' comprises a flip-flop circuit.

Next, the reed switch 11N closes whereby the level of one of the inputs to the NAND 9d which has been L due to the resistor $R_1$ becomes H. The levels of the inputs to the NAND 9d are L and H and the level of the output remains at H, so no signal is sent to the matrix 6 through the condenser C and the lamps 3 stay flashing.

Lastly, the reed switch 11R closes whereby the flip-flop circuit composed of the NANDs 9e and 9e' is reversed so that the level of one of the inputs to the NAND 9d changes from L to H, but as the level of the other input stays at L due to the resistor $R_1$, the level of the output of the NAND 9d remains at H. Therefore, the right turn of the handle post 10 cannot suspend the flashing of the lamps 3.

Next, the handle post 10 is turned to the left. By the closure of the reed switch 11R, the level of the outputs of the NANDs 9e and 9d are H as mentioned above. Then the reed switch 11N closes by the permanent magnet 12 whereby the levels of the two inputs to the NAND 9d become H and the level of the output becomes L. Through the condenser C, the level of one of the inputs to the NAND 9c becomes L and the flashing of the lamps 3 is suspended.

If the switch 7R is closed when the reed switch 11N is ON, the level of the output of the NAND 9d may be L in accordance with the state of the flip-flop circuit. One side of the condenser C connected to the resistor $R_2$ is charged positive for a moment and the level of one of the inputs to the NAND 9c becomes H whereby the flashing of the lamps 3 can be suspended by the reversal of the flip-flop circuit composed of the NANDs 9b and 9c through the switch 7R.

When either one of the reed switches 11L or 11R closes by the action of the permanent magnet 12, all the functions remain unaltered since the level of one of the inputs to the NAND 9d is set at L through the resistor $R_1$ and the output of the NAND 9d stays unchanged.

What is claimed is:

1. A directional turn signal system comprising a handle post, a permanent magnet attached to said handle post, three reed switches arranged around said handle post for sensing a right turn, a left turn and the neutral position of said handle post, a flip-flop circuit composed of a first pair of NAND circuits to which the impulses from the reed switches for sensing the left turn and the right turn of said handle post are fed as inputs, a second pair of NAND circuits to which the logical product of the outputs of said first pair of NAND circuits and the impulse from the reed switch for sensing the neutral position of the handle post is fed as inputs, a group of the manual right turn, left turn and the neutral switches, a pair of flip-flop circuits each comprised of a pair of NAND circuits respectively and their inputs being impulses from the right and the left turn switches and from the neutral switch as well as from the outputs of the second pair of NAND circuits through condensers, and resistors, diodes for transmitting the outputs of a pair of the NAND circuits from said flip-flop circuits to an oscillator, a third pair of NAND circuits the inputs thereof being the outputs of the other pair of NAND circuits from said flip-flop circuit and the impulse from the oscillator, and a pair of relays connected to the third pair of NAND circuits respectively for flashing right and left hand signal lamps.

* * * * *